(12) United States Patent
Struye et al.

(10) Patent No.: US 7,057,188 B2
(45) Date of Patent: Jun. 6, 2006

(54) X-RAY CASSETTE FOR COMPUTED RADIOGRAPHY AND METHOD FOR USE THEREOF

(75) Inventors: Luc Struye, Mortsel (BE); Paul Leblans, Kontich (BE)

(73) Assignee: AGFA-Gevaert, Mortsel (BE)

( * ) Notice: Subject to any disclaimer, the term of this patent is extended or adjusted under 35 U.S.C. 154(b) by 420 days.

(21) Appl. No.: 10/644,191

(22) Filed: Aug. 20, 2003

(65) Prior Publication Data

US 2004/0124368 A1 Jul. 1, 2004

Related U.S. Application Data

(60) Provisional application No. 60/412,836, filed on Sep. 23, 2002.

(30) Foreign Application Priority Data

Sep. 13, 2002 (EP) .................. 02102357

(51) Int. Cl.
*G03B 42/08* (2006.01)
*G21K 4/00* (2006.01)

(52) U.S. Cl. .................. 250/484.4
(58) Field of Classification Search ........... 250/484.4
See application file for complete search history.

(56) References Cited

U.S. PATENT DOCUMENTS

| | | | |
|---|---|---|---|
| 3,153,145 A | 10/1964 | Yerkovich | 250/68 |
| 3,703,272 A | 11/1972 | Lareau | 250/67 |
| 4,015,132 A | 3/1977 | Bushbeck et al. | 250/481 |
| 4,197,947 A | 4/1980 | Zaidi | 206/438 |
| 4,681,227 A * | 7/1987 | Tamura et al. | 206/455 |
| 4,799,591 A | 1/1989 | Tajima et al. | 206/455 |
| 4,827,136 A * | 5/1989 | Bishop et al. | 250/484.4 |
| 5,381,017 A * | 1/1995 | Ohta | 250/484.4 |
| 5,652,781 A | 7/1997 | Armbruster et al. | 378/182 |

FOREIGN PATENT DOCUMENTS

EP    1 158 540    11/2001

OTHER PUBLICATIONS

European Patent Office, European Search Report, Author—Pavon, Application No. 02 10 2357, publication date Nov. 22, 2002.

* cited by examiner

*Primary Examiner*—David Porta
*Assistant Examiner*—Mindy Vu
(74) *Attorney, Agent, or Firm*—Joseph T. Guy; Nexsen Pruet, LLC

(57) ABSTRACT

An X-ray cassette for computed radiography is provided, said cassette having a form of a hollow box comprising top and bottom, front and rear, and lateral sides, said top and bottom sides having width dimensions, between said lateral sides, and depth dimensions, between said front and rear sides, which are substantially greater than the dimensions of said front, rear and lateral sides, between said top and bottom sides, wherein said bottom side and said front, rear and lateral sides have a higher material stiffness than the top side and wherein said top side is a deformable carrier or support material, supporting a storage or stimulable phosphor sheet layer.

88 Claims, 1 Drawing Sheet

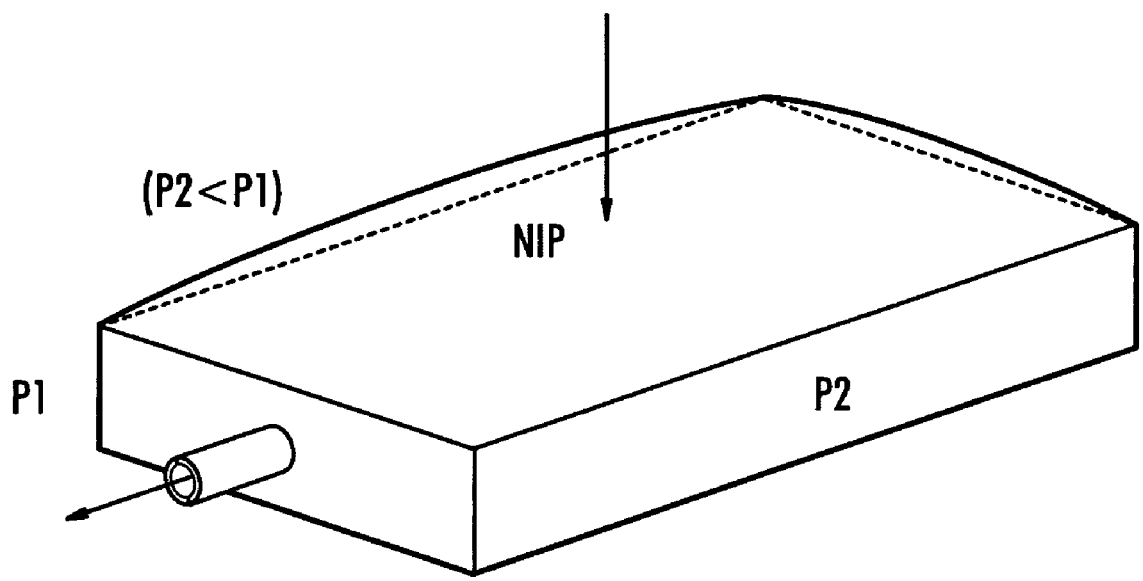

X-RAY CASSETTE FOR COMPUTED RADIOGRAPHY AND METHOD FOR USE THEREOF

This application claims the benefit of Provisional Application Ser. No. 60/412,836, filed Sep. 23, 2002.

FIELD OF THE INVENTION

The present invention relates to a storage phosphor plate having a particular design, suitable for use in a flat scanner apparatus.

BACKGROUND OF THE INVENTION

A well-known use of phosphors is in the production of X-ray images. In a conventional radiographic system an X-ray radiograph is obtained by X-rays transmitted image-wise through an object and converted into light of corresponding intensity in a so-called intensifying screen (X-ray conversion screen) wherein phosphor particles absorb the transmitted X-rays and convert them into visible light and/or ultraviolet radiation to which a photographic film is more sensitive than to the direct impact of X-rays.

In said conventional radiography ("X-ray photography"), a film plate is made by forming one or more silver halide emulsion layers on a flexible film base which is supported within a light-tight cassette. The interior of the cassette is coated with one or more X-ray sensitive luminescent layers. The cassette containing an unexposed X-ray film plate is loaded into an X-ray machine, and after exposure the cassette and exposed X-ray film plate are removed for development and fixing of the latent image produced. This is usually done automatically by feeding the cassette into a light-tight apparatus in which the cassette is opened, and the exposed film plate is extracted and passed through a series of troughs containing the various chemical processing solutions as required. The processed plate may also be dried in the apparatus. Meanwhile, a new, unexposed film plate has been loaded into the cassette which is then re-closed, and the reloaded cassette and developed film plate are delivered to respective exit slots of the processing apparatus.

According to another method of recording and reproducing an X-ray pattern disclosed e.g., in U.S. Pat. No. 3,859,527, a special type of phosphor is used, known as a photo-stimulable phosphor, which being incorporated in a panel or screen, is exposed to incident pattern-wise modulated X-ray beam and, as a result thereof, temporarily stores energy contained in the X-ray radiation pattern. At some interval after the exposure, a beam of visible or infra-red light scans the panel or screen in order to stimulate the release of stored energy as light that is detected and converted to sequential electrical signals which can be processed to produce a visible image. For this purpose, the phosphor should store as much as possible of the incident X-ray energy and emit as little as possible of the stored energy until stimulated by the scanning beam. This is called "photostimulated light—PSL—radiography", "digital radiography" or "Computed Radiography" (CR).

Current practice in "photostimulated ligth radiography" has been to pass the exposed PSL plate in its cassette to an automatic processing machine in which the PSL plate is removed from the cassette, scanned, exposed overall to light in order to return the PSL material to its ground state and then reloaded into the same cassette for reuse. For scanning, the exposed PSL plate is transported past a laser, which scans line-wise across the plate in front of a light-guide comprising a bundle of optical fibres whose input ends are arranged in a line across the path of the plate close to the laser scanning line for the reception of light emitted, typically at wavelengths close to 400 nm, when the PSL material is stimulated by the laser. The light-guide is arranged to pass the emitted light to a photo-multiplier tube or other receptor. The result is a storable electronic raster image. The electronic image may be subjected to any desired computer image-enhancement techniques and it may be displayed on a video display unit, fed to a laser printer for the production of a plain paper copy, or used to control a laser arranged to expose correspondingly a photographic film plate to produce an X-ray plate of conventional appearance.

In U.S. Pat. No. 5,340,995 there has been provided a scanning apparatus for scanning a cassette of the type used in photo-stimulable luminescence ("PSL") radiography, which cassette comprises a flat substantially rigid base plate which is releasably securable to the base plate so as light-tightly to cover a layer of PSL material applied to a face of the base plate, characterized in that such apparatus comprises a receiving station for the receipt of a cassette into the apparatus, transport means for conveying the cassette to a separating station which includes means for separating the base plate and its cap from each other, means for transporting the base plate along a path leading through a scanning station where the plate may be scanned and, via an erasing station, to an assembly station where the plate and its cap are re-assembled, the apparatus being arranged in such a way that the cap and the base plate remain in substantially parallel relationship during their separation. The arrangement thus avoids flexure of the layer of PSL material on the plate and offers a compact construction.

In U.S. Pat. No. 6,373,074 an advanced device has been described for the line by line read out of information stored in a phosphor carrier with a radiation source that can generate several individual beams, in order to emit a primary radiation providing ability to stimulate the phosphor carrier such that it emits a secondary radiation that contains at least a partial reproduction of the stored information. A receiving device for point by point reception of the secondary radiation emitted by the phosphor carrier includes a multitude of point elements, wherein the secondary radiation that is emitted by the phosphor carrier can be received at the same time by a plurality of these point elements, wherein the radiation source includes an optical device for expanding the several individual beams in the direction of a line on the phosphor carrier. Furtheron the device comprises reproduction means, located between the phosphor carrier and the receiving device, for imaging the secondary radiation emitted by the individual points of the phosphor carrier in a ratio of 1:1 on the individual point elements.

An X-ray cassette has moreover been claimed in the same U.S. Pat. No. 6,373,074 for writing to a phosphor carrier contained in the cassette, the improvement wherein the cassette includes a radiation source for emitting a primary radiation that can be used to stimulate the phosphor carrier such that it emits a secondary radiation for line-by-line read out of information stored in the phosphor carrier, wherein said secondary radiation contains at least a partial image of the stored information, and wherein the cassette includes a receiving device for point-by-point reception of the secondary radiation emitted by the phosphor carrier, wherein the receiving device contains a multitude of point elements and where the secondary radiation emitted by the phosphor carrier can be received by several of these point elements at the same time.

In EP-A 1 130 417 and US-Application 2001/0017356 a system for reading a radiation image has been described, said system comprising an array of imaging elements arranged to detect said radiation image and to convert it into a charge representation of said image, as well as charge integrating means coupled to said array of imaging elements for integrating an amount of charge detected by an element of said array characterized by means for determining or setting a charge amount which is expected to be detected, means for adjusting the charge storage capacity of said charge integrating means in accordance with the expected charge amount.

It is clear that the image quality produced by any radiographic system using a phosphor screen, thus also by a computer radiography (CR) system, depends largely on the construction of the phosphor screen. Generally, the thinner a phosphor screen at a given amount of absorption of X-rays, the better the image quality will be. This means that the lower the ratio of binder to phosphor of a phosphor screen, the better the image quality, attainable with that screen, will be. Optimum sharpness can thus be obtained when screens without any binder are used. Such screens can be produced, e.g., by physical vapor deposition, which may be thermal vapor deposition, sputtering, electron beam deposition or other of phosphor material on a substrate.

Good image quality also implies that the sensitivity and the sharpness of the system is constant over the image area. I.e. when a CR screen is scanned in a CR scanner after a flat-field exposure, the signal should be as homogeneous as possible. In order to achieve this goal a screen with a homogeneous sensitivity should be used. It is necessary as well, however, to have a scanning system that is as constant in quality as possible. An important parameter that influences the quality consistency of the system is the distance between the CR screen phosphor layer and the light detector in the CR scanner. The light collection efficiency of the light detector critically depends on the distance between the phosphor layer and the light detector. This is the case when the light detector in the scanner consists of a photomultiplier tube (PMT) and a light guide to guide the emission light to the PMT as is the case in a flying-spot scanner. This is even more so when the light detector in the scanner consists of a CCD array and a lens system (SELFOC or microlens) in order to project the emission light of the phosphor screen onto the CCD elements as in a scanner scanning line-wise or two-dimensional-area wise. In general, the larger the distance between the phosphor layer and the light detector, the lower the sensitivity of the CR system.

Since the optical system in the scanner in general has a limited sharpness depth also sharpness will be affected by the distance between the CR screen and the light detector in the CR scanner. Having a variable distance between screen and light detector causes the sharpness of the image to vary over the image area, which is evidently not allowed.

The only practical way of making the distance between the phosphor layer and the light detector as constant as possible is by having a light detector that is as flat as possible and a screen that is as flat as possible and by moving the flat surface of the detector over the flat surface of the screen at a constant distance. A good way of having a flat phosphor surface for scanning is by having a plate that is constant in thickness and by pushing or pulling the plate onto a very flat surface. An excellent way to achieve this is by pulling the plate onto a flat-bed in the scanner by vacuum suction.

If the edges or corners of the screen are upstanding when the screen is placed onto the vacuum table, air leaks always exist at the upstanding side and the space between the screen back and the vacuum table cannot be evacuated, leading to no vacuum. Likewise, if the curvature of the screen is too large, a spacing will exist between the screen back and the vacuum table leading to air leaking and loss of vacuum.

It is clear from the background as set forth above that reading out a stimulable phosphor panel having needle-shaped phosphors requires stringent demands from the point of view of flatness of the flat panel as otherwise light escapes, resulting in loss of speed (sensitivity) and image definition (sharpness). The technology as set forth even tolerates a curvature of not more than 100 μm. A "flat" storage phosphor panel as such does not provide such a reduced curvature, so that a solution therefor is highly requested.

OBJECTS AND SUMMARY OF THE INVENTION

It is an object of the present invention to offer a CR system leading to an excellent image quality that is constant over the whole image area.

That object has been realized by offering a CR system, making use of a screen having a binderless phosphor layer that provides ability to be flattened in the CR digitizer, wherein said binderless phosphor layer is present on a flexible carrier, the curvature of which is changed by pressure as set out in claim 1.

Specific features for preferred embodiments of the invention are set out in the dependent claims.

Further advantages and embodiments of the present invention will become apparent from the following description and drawing.

BRIEF DESCRIPTION OF THE DRAWING

The FIGURE shows the particular design of the cassette device in form of a "hollow box" having top and bottom, front and rear and lateral sides, said top and bottom sides having width dimensions, between said lateral sides, and depth dimensions, between said front and rear sides, which are substantially greater than the dimensions of said front, rear and lateral sides, between said top and bottom sides, wherein said bottom side and said front, rear and lateral sides have a higher material stiffness than the top side and wherein said top side is a deformable convex carrier material for the storage or stimulable phosphor sheet layer (NIP or "needle image plate"), which provides ability for top and bottom side of the box to become plan parallel as a consequence of an under-pressure by suction of air (or another—preferably inert—gas) from an opening in at least one of the front, the rear or the lateral sides of the hollow box (direction of the arrow leaving the box away from the opening in the lateral side) indicating the direction of the air as pressure P2 inside the box is lower than P1 outside the box. The other arrow near the top side NIP-sheet or panel indicates that the top panel is deformed when taking air from the box by suction, making use of a pump, thus flattening the top side panel in order to get a plan parallel top and bottom side.

DETAILED DESCRIPTION OF THE INVENTION

It is clear that the disadvantages, when applying a suction table in order to provide a flat storage phosphor sheet or panel in the scanning unit, have inventively been overcome by the device in form of a hollow box carrying the storage phosphor layer on its curved top plane. Features required from the part of the physical characteristics of the storage phosphor panel when a vacuum suction table is applied, may fail, but are redundant in the context of the present invention.

According to the present invention as an essential feature an X-ray cassette for computed radiography is provided, wherein said cassette has a form of a hollow box comprising top and bottom, front and rear and lateral sides, said top and bottom sides having width dimensions, between said lateral sides, and depth dimensions, between said front and rear sides, which are substantially greater than the dimensions of said front, rear and lateral sides, between said top and bottom sides, wherein said bottom side and said front, rear and lateral sides have a higher material stiffness than the top side and wherein said top side is a deformable carrier or support material, characterized in that said support material is covered with a storage or stimulable phosphor sheet layer.

An X-ray cassette according to the present invention is further provided with an opening in one of the front, rear or lateral sides. Said hollow box is filled, in the inner hollow space surrounded by the front, rear and lateral sides as well as by the top and bottom sides by air, an inert gas (or a mixture of gases) or a liquid. Most preferred—and most simple—is use of air as such, as in that case no special measures have to be taken in order to close the opening (in case of use of inert gas(es) or a liquid, preferably situated in the front, rear or a lateral side when no contact is made with a pump in order to change pressure in the interior hollow space of the hollow box. Moreover use of a liquid as e.g. water, an aqueous solution or oil, although not excluded, may be of less practical use as contact of liquids with stimulable phosphors should be avoided as otherwise corrosion of phosphors by liquids may occur, reason why measures have indeed been taken in order to make the flat panels moisture-repellent or moisture-resistant as has e.g. been s described in EP-A's 1 286 363, 1 286 364, and 1 316 970. Contact with oil may make sensitivity decrease, reason why e.g. packages as described in EP-Application No. 02102069, filed Jul. 30, 2002, are recommended. As a consequence it is recommended to make use of air or another gas or mixture of gases, wherein as an alternative for air inert gases are particularly suitable for use, as e.g. nitrogen, helium or argon.

In a preferred embodiment of the present invention said hollow box is thus filled with air, wherein said box is further provided with an opening in one of the front, rear or lateral sides, in order to have the same (atmospheric) pressure in the inner hollow part of the box and on the outer part thereof as long as no further connection is externally made with a source of air pressure (like a pump) in order to cause an underpressure or overpressure in the hollow inner part of the "hollow box" cassette.

In a preferred embodiment according to the present invention, in view of image definition, the X-ray cassette is provided with a phosphor layer sheet covering the deformable top side as set forth, wherein said phosphor sheet layer is a binderless storage phosphor layer.

The storage phosphor used in the said phosphor sheet layer of the X-ray cassette of the present invention preferably is an alkali metal storage phosphor. Such a phosphor has been disclosed in U.S. Pat. No. 5,736,069 and corresponds to the formula:

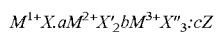

$$M^{1+}X.aM^{2+}X'_2bM^{3+}X''_3:cZ$$

wherein:

$M^{1+}$ is at least one member selected from the group consisting of Li, Na, K, Cs and Rb, $M^{2+}$ is at least one member selected from the group consisting of Be, Mg, Ca, Sr, Ba, Zn, Cd, Cu, Pb and Ni, $M^{3+}$ is at least one member selected from the group consisting of Sc, Y, La, Ce, Pr, Nd, Pm, Sm, Eu, Gd, Tb, Dy, Ho, Er, Tm, Yb, Lu, Al, Bi, In and Ga, Z is at least one member selected from the group $Ga^{1+}$, $Ge^{2+}$, $Sn^{2+}$, $Sb^{3+}$ and $As^{3+}$, X, X' and X" can be the same or different and each represents a halogen atom selected from the group consisting of F, Br, Cl, I and $0 \leq a \leq 1$, $0 \leq b \leq 1$ and $0 < c \leq 0.2$.

An especially preferred phosphor for use in a panel or screen of the present invention is a CsX:Eu stimulable phosphor, wherein X represents a halide selected from the group consisting of Br and Cl, produced by a method comprising the steps of:

mixing said CsX with between $10^{-3}$ and 5 mol % of a Europium compound selected from the group consisting of EuOX', EuX'$_2$ and EuX'$_3$, X' being a member selected from the group consisting of F, Cl, Br and I;

firing said mixture at a temperature above 450° C.;

cooling said mixture and recovering the CsX:Eu phosphor.

Such a phosphor has been disclosed in EP-A-1 203 394.

The phosphor is preferably vacuum deposited on the support under conditions disclosed in EP-A-1 113 458 and EP-A-1 118 540.

In the most preferred embodiment the X-ray cassette according to the present invention is provided with a phosphor sheet layer comprising a binderless needle shaped CsX:Eu phosphor, wherein X represents a halide selected from the group consisting of Br and Cl.

According to the present invention the X-ray cassette further has a protective layer which is provided at least as as an outermost layer covering said storage phosphor layer and, optionally, as an auxiliary layer between said storage phosphor layer and said support.

A protective layer or barrier layer can, in principle, be any moisture barrier layer known in the art, but is preferably a layer of parylene. Most preferred polymers for use in the barrier layer of the present invention are vacuum deposited, preferably chemical vacuum deposited poly-p-xylylene film. A poly-p-xylylene has repeating units in the range from 10 to 10000, wherein each repeating unit has an aromatic nuclear group, whether or not substituted. As a basic agent the commercially available di-p-xylylene composition sold by the Union Carbide Co. under the trademark "PARYLENE" is thus preferred. The preferred compositions for the barrier layer are the unsubstituted "PARYLENE N", the monochlorine substituted "PARYLENE C", the dichlorine substituted "PARYLENE D" and the "PARYLENE HT" (a completely fluorine substituted version of PARYLENE N, opposite to the other "parylenes" resistant to heat up to a temperature of 400° C. and also resistant to ultra-violet radiation, moisture resistance being about the same as the moisture resistance of "PARYLENE C"). Most preferred polymers for use in the preparation of the barrier layer in a panel of this invention are poly(p-2-chloroxylylene), i.e. PARYLENE C film, poly(p-2,6-dichloroxylylene), i.e. PARYLENE D film and "PARYLENE HT" (a completely fluorine substituted version of PARYLENE N. According to the present invention said X-ray cassette said protective layer and said optionally present auxiliary layer, are both layers of parylene wherein said parylene is selected from the group consisting of parylene C, parylene D and parylene HT.

The advantage of parylene layers as moisture barrier layers in a panel or screen of the present invention layer is the temperature resistance of the layers, the temperature resistance of the parylene layers is such that they can withstand the temperature need for vacuum depositing the storage phosphor. The use of parylene layers in storage phosphor screens has been disclosed in, e.g., EP-A's 1 286 363, 1 286 364, 1 286 362 and 1 286 365.

The X-ray cassette according to the present invention further has a deformable carrier or support, wherein said deformable carrier or support material is convex, concave or plan parallel with respect to the bottom side of said cassette.

Preferably said X-ray cassette has plan parallel top and bottom sides just before scanning in a scanning apparatus. Therefore as soon as the exposed X-ray cassette according to the present invention has been mounted in the scanner, the cassette is connected to an air (or inert gas) pressure device via the opening, set forth above.

According to the present invention the X-ray cassette in form of a hollow box has plan parallel top and bottom sides, provided by the method of changing pressure in the hollow inner area of the cassette through an opening in at least one of the front, the rear or the lateral sides.

In a preferred embodiment according to the method of the present invention deforming the carrier or support material of an X-ray cassette as disclosed hereinbefore proceeds by the steps of mounting said cassette in a scanning unit or apparatus;
connecting the inlet opening of the cassette with a pump;
changing pressure by sucking from or adding to the cassette air, an inert gas or a liquid.

According to the method of the present invention changing pressure is applied to such an extent that the stimulable phosphor sheet layer is deformed in that its curvature is minimized, wherein said curvature is continuously measured by a device or apparatus connected with or present nearby the scanning unit or apparatus.

In a further preferred embodiment according to the method of the present invention changing pressure is stopped as soon as curvature has been measured to have been minimized, followed by starting scanning of the stimulable phosphor plate, which is provided thereby as a desired plan parallel cassette in form of the hollow box described hereinbefore.

According to another embodiment (and expressed in a more quantitative way) changing pressure is stopped by stopping the pump as soon as curvature has been measured to have been minimized up to a tolerance level of not more than 100 μm. It is preferred to perform this action automatically by providing a device measuring curvature of the storage phosphor layer onto the top side of the box, wherein said device is connected with the scanning apparatus as a detector. According to the method of the present invention the same detector gives a signal to the scanning apparatus in order to start the scanning procedure as soon as curvature has been measured to be minimized. Normally pressure in the inner part of the hollow box is held constant during scanning, but means for correcting may additionally be provided in order to further optimize the tolerances of curvature in order to avoid them to exceed a value of 100 μm, which is already a quite severe condition as set forth above. It is clear that according to the method of the present invention pressure changes are provided by suction of air (or an inert gas) from the inner area of the hollow box as long as the storage phosphor panel is convex with respect to the bottom side of the X-ray cassette or blowing of air (or an inert gas) into the inner area of the hollow box as long as the storage phosphor panel is concave with respect to the bottom side thereof.

It is an essential feature of the hollow box, that the top plane carrying the stimulable phosphor layer, has a material stiffness that is lower than the material stiffness of the bottom plane and the side walls (called "front", "rear" and "lateral" sides) respectively. The requisite stiffness or rigidity against bending or flexing should be present along any directions, apart for the top layer direction as the said top layer should be deformable.

Differences in material stiffness, if appearing, between bottom plane and side walls should indeed be smaller than between top plane carrying the stimulable phosphor layer and the side walls in order to allow changes in pressure in the hollow space area of the hollow box, without substantially deforming the said bottom plane or side wall surfaces. Preferred materials for the side walls and the bottom side are e.g. aluminum, tungsten, stainless steel, titanium, brass. The deformable top side carrying the stimulable phosphor layer may be composed of the same material as that of the bottom side, provided that e.g. thickness of the bottom side layer is substantially higher than that of the top side layer. In the alternative other materials may be provided such as e.g. a-C (amorphous carbon), Cu, heat resitant resins such as PTFE (polytetrafluorethylene), fluorocarbon resin and acrylic resins.

The said changes in pressure are, in one embodiment, provided as an underpressure, decreasing pressure in the hollow box device having a convex upper or top surface plane, wherein the tube perforating the side walls (the front, the rear or one of the lateral walls) performs a suction action upon the air present in the said hollow box device.

In the alternative the said changes in pressure are, as expressed in another way, provided as an overpressure, increasing pressure in the hollow box device having a concave upper or top surface plane, wherein the tube perforating the side walls (the front, the rear or one of the lateral walls) performs a blowing action upon the air (or inert gas) present in the said hollow box device.

In order to avoid twisting and warping of the side walls it is recommended to have the side walls present as a rigid frame arranged along said, front rear and lateral sides of the device in order to provide sufficient material stiffness able to withstand deformation more than the deformable top or upper surfacer plane carrying the stimulable phosphor layer.

It is recommended to provide a rapidly measuring device having sufficiently short reaction time in order to determine curvature of the storage phosphor layer on top of the hollow box and in order to stop changes in pressure applied upon the air inside the hollow box s as soon as flatness of the top surface area is optimized, or, expressed otherwise, as soon as curvature is minimized.

The said device measuring curvature of the phosphor layer on top of the hollow box is preferably built in in the scanning device and preferably acts as a controlling device inhibiting starting the scanning action of the storage phosphor plate as long as no minimized curvature has been reached or, in the alternative, provoking starting the said scanning action as soon as a minimized (or optimized) curvature has been measured. Before starting the scanning action the measuring system provides a signal whether pressure should be increased (in case of a negative curvature, still present if the hollow box still has a concave surface) or decreased (in case of a positive curvature, still present if the hollow box still has a convex surface). In a preferred embodiment the measuring device calculates differences (changes) in curvature as a function of changes in pressure and accurately determines when these changes are minimized. As the measuring device searches for the equilibrium point where pressure changes are minimized, pressure changes are stopped at that point and a signal is directed to the scanner in order to start up the scanning procedure.

Pressure changes caused by an air pump may be performed continuously or discontinuously and may be constant as a function of time or variable.

In praxis the upper or top side of the hollow box is thin (in the range from 0.2 mm up to 1 mm) and is easily deformed by an over- or underpressure. As the bottom side should be more solid (less deformable) in order to keep its shape, it is recommended to provide a thickness for the bottom side which is 2 to 5 times the thickness of the bottom side. As desired the upper surface carrying the phosphor will deform most by a changes in pressure whereas the bottom surface will retain its flat form. Distances between top and bottom layer inside the hollow box may vary in the range from 1 mm up to 10 mm. At the side of the lateral walls of the box an inlet opening is provided in order to change the pressure within the box. The said pressure within the box may be changed from 0.1 bar (underpressure) up to 2 bar (overpressure) by a pumping air or an inert gas. The material can be aluminum (available as a relatively thin, lightweight sheet material), Cu or steel. Using steel will obtain a longer lifetime, because it can be deformed many times before it cracks. Also plastics or resins can be used because these materials are showing a good flexibility. While pressure has been changed upon the upper or top layer, the said upper or top layer becomes flat. In order to detect the flatness (lack for curvature) of the top layer, the detector can be placed in the middle of the box. The said flatness can also been detected indirectly by analysing the image that is scanned. A larger signal in the middle of the image is caused by a smaller distance from the phosphor to the detector when the top surface is convex, and can be corrected by decreasing the pressure. The pressure may be varied until the signal in the middle of the image is equal to the signal at the borders when a flatfield is taken. At that moment the hollow box has plan-parellel top and bottom sides as requested for a scan providing excellent image quality.

In an alternative embodiment the hollow box is conceived as a "double" hollow box, in that the box is divided into two hollow spaces, divided by a stiff support inbetween, wherein both spaces are filled with a gas (air, an inert gas, mixtures of different gases) or a liquid and wherein at both sides a flexible support is carrying a storage phosphor layer. Said storage phosphor layers, again are covered with a protective layer each, and, optionally an intermediate layer is present. A preferred composition for said protective and said optional intermediate layers again is parylene as explained hereinbefore. The two flexible sides (on the top and bottom side respectively) preferably have an equal curvature when in the internal stiff support a hole provides entrance in both hollow spaces of gas or liquid, but as such a construction is not self evident it is preferred to have the two hollow spaces completely separated one from another in order to controll curvature of both phosphor sides independently as has been described for the hollow box having only one storage layer on the top side. Two independent inlets for making connection with a pump system are required in this arrangement, and, in order to provide excellent flatness at both the top and bottom storage panel, an apparatus for measuring curvature is also more complicated as two measurements changing curvature as a consequence of changing pressure in the two hollow spaces should be performed. In such a construction of a "double hollow box", covered at both sides with a storage phosphor sheet or layer, read-out should be performed in reflection, so that the flexible carrier supports should not necessarily be transparent anymore. It is clear that the "double hollow box", after having been deformed in order to get two plan parallel storage phosphor panels should be as thin as possible in the whole arrangement of a flat panel as envisaged.

In order to provide absorption of radiation by the supporting material of the box in an amount as low as possible, it is clear that the material should be selected as a function thereof. Preferred thereof is amorphous carbon (a-C) already mentioned before and described in e.g. in EP-Application No. 02100764, filed Jun. 28, 2002, wherein said supporting material with low absorption of penetrating radiation is known to have a high mechanical strength.

In view of the object to guarantee efficient creation and detection of photostimulated light, without leading to reduced resolution, i.e., to offer a CR screen that simultaneously provides high sensitivity and good resolution, the supporting layer preferably has a reflectivity of more than 80% as described e.g. in EP-Application No. 02100763, filed Jun. 28, 2002. So an aluminum layer coated onto an amorphous carbon support forms a highly preferred support arrangement for the storage phosphor sheet or panel.

Furtheron care must be taken that no impress or imprint is present on the image obtained as a consequence of pressure changes, applied to the deformable sides of the box, carrying the storage phosphor sheet or layer, as such an impress or imprint lays burden upon the diagnostic value of the image obtained.

Procedures for double-side reading of storage phosphor panels as described e.g. in U.S. Pat. Nos. 5,534,710; 5,880,476 and 6,344,657 may be applied wherein a procedure of a combined reading and erasing step in parallel has been described, which is very advantageous from the viewpoint of performing a radiation image recording and reproducing method quickly and efficiently, free from reproducing noisy radiation images. Such a system is further recommended as it is advantageous because the whole apparatus can be constructed in a relatively small size.

Just as in U.S. Pat. No. 5,591,982 a radiation image storage panel may be provided wherein storage phosphor layers are colored, e.g. in case of binderless storage phosphor panels as recently disclosed in EP-Application No. 02100296, filed Mar. 26, 2002. Differences in amounts of dyes for both storage panels provide an excellent sharpness and graininess for the radiation image reproduced in the double-side reading system of the present invention as is provided by a "double hollow box".

In double-side reading, by carrying out e.g. an addition process on signals obtained from both sides at pixels corresponding to each other, light collection efficiency improves and noise components are averaged, so that a signal to noise ratio of a radiation image obtained in this manner can be improved.

In case of asymmetric arrangements of storage panels, i.a. when storage phosphor sheets having same phosphors but differing amounts of phosphor coated and/or differing amounts of dye present, measures should be taken in order to discriminate top and bottom side of the "double box" from each other, e.g. by providing a shape of the radiation image storage panel being asymmetric with respect to a center axis of the radiation image storage panel, which center axis may extend in an antero-posterior direction of the radiation image storage panel as has e.g. been described in US-Application No. 2001/035502.

Identification means may further be present onto the hollow box, and, in order to avoid loss of information due to partial coverage of the flat panel by said identification means, the said identification may be provided onto the front, the rear and/or lateral sides of the hollow box in form of e.g. a bar code or a magnetic strip, without however being limited thereto. So first and second bar codes just as e.g. described in EP-A 1 039 338 may be effective, if applied in the present invention, in order to determine whether one or two stimulable phosphor sheet(s) is(are) housed in the cassette is either a "single-sheet" or a "double-sheet" hollow box and for the user to register ID information.

Apart therefrom information dimension data of a storage phosphor contained in the cassette may be provided as has e.g. been described in EP-A 0 903 618. An identification system for matching the X-ray radiation image obtained from a patient and the identification information may further be provided, as is known e.g. from EP-A 0 603 511.

Light-weight materials are recommended in order to build up the hollow box of the present invention, especially in favor of manutention. In as far as the materials for use as supporting materials have a high mechanical strength and show enough heat-resistance in order to survive chemical vapor depositions of e.g. parylene layers and binderless storage phosphor layers, such materials are suitable as e.g. amorphous carbon and heat-resistant resins such as PTFE (polytetrafluorethylene) as a preferred fluorocarbon resin. Opposite thereto acrylate resins are only suitable as stiff, non-deformable support material, as being not enough heat-resistant in the conditions as envisaged in the preparation method of the hollow box of the present invention. Another light-weight material as e.g. "hylite" (an aluminum-polypropylene-aluminum combination mentioned in EP-A's 0 905 715 and 0 919 859) may also be used.

According to the present invention a method for producing an X-ray cassette in form of a hollow box as disclosed above is given, said method comprising the steps of:
- providing a hollow box having plan parallel bottom and top sides,
- vacuum depositing a storage phosphor layer on said top side,
- vacuum depositing a protective parylene layer onto said storage phosphor layer.

Further according to the present invention, in another more complicated embodiment in favor of increased speed, a method is offered for producing an X-ray cassette in form of a hollow box as disclosed before, said method being characterized by the steps of
- providing (on one hand) a hollow box having plan parallel bottom and top sides,
- vacuum depositing a protective parylene layer onto said top side,
- providing (at the other hand) a storage phosphor layer having been coated or deposited onto a support from which it is releasable,
- laminating said storage phosphor layer onto said parylene layer, which covers the said hollow box,
- removing said support from which it is releasable,
- covering said phosphor layer with a protective layer.

It is clear that in case of a "double hollow box" the same methods can be applied, provided that the "bottom side" as mentioned above is corresponding with the support separating the two inner hollow spaces and that each large outermost face functions as a top side, consisting of a deformable side, to be covered with a storage phosphor layer, which should further be protected by a protective layer (preferably being composed of parylene as set forth hereinbefore).

What is claimed is:

1. An X-ray cassette for computed radiography having a form of a hollow box, filled in the inner part with air, an inert gas or a liquid, said box comprising top and bottom, front and rear and lateral sides, said top and bottom sides having width dimensions, between said lateral sides; and depth dimensions, between said front and rear sides, which are substantially greater than the dimensions of said front, rear and lateral sides, between said top and bottom sides, wherein said bottom side and said front, rear and lateral sides have a higher material stiffness than the top side and wherein said top side is a deformable carrier or support material, characterized in that said support material is covered with a storage or stimulable phosphor sheet layer.

2. An X-ray cassette according to claim 1, wherein said hollow box, when filled with air, is further provided with an opening in one of the front, rear or lateral sides.

3. An X-ray cassette according to claim 2, wherein said phosphor sheet layer is a binderless storage phosphor layer.

4. An X-ray cassette according to claim 3, wherein said phosphor sheet layer comprises a binderless needle shaped CsX:Eu phosphor, wherein X represents a halide selected from the group consisting of Br and Cl.

5. An X-ray cassette according to claim 4, wherein a protective layer is provided at least e-s as an outermost layer covering said storage phosphor layer and, optionally, as an auxiliary layer between said storage phosphor layer and said support.

6. An X-ray cassette according to claim 5 wherein said protective layer and said optionally present auxiliary layer, is a layer of parylene wherein said parylene is selected from the group consisting of parylene C, parylene D and parylene HT.

7. An X-ray cassette according to claim 4, wherein said deformable carrier or support material is convex, concave or plan parallel with respect to the bottom side of said cassette.

8. An X-ray cassette according to claim 4, wherein a protective layer is provided at least as an outermost layer covering said storage phosphor layer and, optionally, as an auxiliary layer between said storage phosphor layer and said support.

9. An X-ray cassette according to claim 8 wherein said protective layer and said optionally present auxiliary layer, is a layer of parylene wherein said parylene is selected from the group consisting of parylene C, parylene D and parylene HT.

10. An X-ray cassette according to claim 3, wherein said deformable carrier or support material is convex, concave or plan parallel with respect to the bottom side of said cassette.

11. An X-ray cassette according to claim 2, wherein a protective layer is provided at least as an outermost layer covering said storage phosphor layer and, optionally, as an auxiliary layer between said storage phosphor layer and said support.

12. An X-ray cassette according to claim 11 wherein said protective layer and said optionally present auxiliary layer, is a layer of parylene wherein said parylene is selected from the group consisting of parylene C, parylene D and parylene HT.

13. An X-ray cassette according to claim 12, wherein said deformable carrier or support material is convex, concave or plan parallel with respect to the bottom side of said cassette.

14. An X-ray cassette according to claim 11, wherein said deformable carrier or support material is convex, concave or plan parallel with respect to the bottom side of said cassette.

15. An X-ray cassette according to claim 2, wherein said deformable carrier or support material is convex, concave or plan parallel with respect to the bottom side of said cassette.

16. An X-ray cassette according to claim 1, wherein said phosphor sheet layer is a binderless storage phosphor layer.

17. An X-ray cassette according to claim 16, wherein said phosphor sheet layer comprises a binderless needle shaped CsX:Eu phosphor, wherein X represents a halide selected from the group consisting of Br and Cl.

18. An X-ray cassette according to claim 17, wherein a protective layer is provided at least as an outermost layer covering said storage phosphor layer and, optionally, as an auxiliary layer between said storage phosphor layer and said support.

19. An X-ray cassette according to claim 18 wherein said protective layer and said optionally present auxiliary layer, is a layer of parylene wherein said parylene is selected from the group consisting of parylene C, parylene D and parylene HT.

20. An X-ray cassette according to claim 17, wherein said deformable carrier or support material is convex, concave or plan parallel with respect to the bottom side of said cassette.

21. An X-ray cassette according to claim 16, wherein a protective layer is provided at least as an outermost layer covering said storage phosphor layer and, optionally, as an auxiliary layer between said storage phosphor layer and said support.

22. An X-ray cassette according to claim 21 wherein said protective layer and said optionally present auxiliary layer, is a layer of parylene wherein said parylene is selected from the group consisting of parylene C, parylene D and parylene HT.

23. An X-ray cassette according to claim 16, wherein said deformable carrier or support material is convex, concave or plan parallel with respect to the bottom side of said cassette.

24. An X-ray cassette according to claim 1, wherein a protective layer is provided at least as an outermost layer covering said storage phosphor layer and, optionally, as an auxiliary layer between said storage phosphor layer and said support.

25. An X-ray cassette according to claim 24 wherein said protective layer and said optionally present auxiliary layer, is a layer of parylene wherein said parylene is selected from the group consisting of parylene C, parylene D and parylene HT.

26. An X-ray cassette according to claim 25, wherein said deformable carrier or support material is convex, concave or plan parallel with respect to the bottom side of said cassette.

27. An X-ray cassette according to claim 24, wherein said deformable carrier or support material is convex, concave or plan parallel with respect to the bottom side of said cassette.

28. An X-ray cassette according to claim 1, wherein said deformable carrier or support material is convex, concave or plan parallel with respect to the bottom side of said cassette.

29. Method of deforming the carrier or support material of an X-ray cassette according to having a form of a hollow box, filled in the inner part with air, an inert gas or a liquid, said box comprising top and bottom, front and rear and lateral sides, said top and bottom sides having width dimensions, between said lateral sides; and depth dimensions, between said front and rear sides, which are substantially greater than the dimensions of said front, rear and lateral sides, between said top and bottom sides, wherein said bottom side and said front, rear and lateral sides have a higher material stiffness than the top side and wherein said top side is a deformable carrier or support material, characterized in that said support material is covered with a storage or stimulable phosphor sheet layer, by the steps of
mounting said cassette in a scanning unit or apparatus;
connecting the inlet opening of the cassette with a pump;
changing pressure by sucking from or adding to the cassette air, an inert gas or a liquid.

30. Method of deforming the carrier or support material of an X-ray cassette according to claim 29 wherein said hollow box, when filled with air, is further provided with an opening in one of the front, rear or lateral side, by the steps of
mounting said cassette in a scanning unit or apparatus;
connecting the inlet opening of the cassette with a pump;
changing pressure by sucking from or adding to the cassette air, an inert gas or a liquid.

31. Method of deforming the carrier or support material of an X-ray cassette according to claim 30 wherein said phosphor sheet layer is a binderless storage phosphor layer, by the steps of
mounting said cassette in a scanning unit or apparatus;
connecting the inlet opening of the cassette with a pump;
changing pressure by sucking from or adding to the cassette air, an inert gas or a liquid.

32. Method of deforming the carrier or support material of an X-ray cassette according to claim 31 wherein said phosphor sheet layer comprises a binderless needle shaped CsX:Eu phosphor, wherein X represents a halide selected from the group consisting of Br and Cl, by the steps of
mounting said cassette in a scanning unit or apparatus;
connecting the inlet opening of the cassette with a pump;
changing pressure by sucking from or adding to the cassette air, an inert gas or a liquid.

33. Method according to claim 32, wherein changing pressure is applied to such an extent that the stimulable phosphor sheet layer is deformed in that its curvature is minimized, wherein said curvature is continuously measured by a device or apparatus connected with or present nearby the scanning unit or apparatus.

34. Method according to claim 33, wherein changing pressure is stopped as soon as curvature has been measured to have been minimized, followed by starting scanning of the stimulable phosphor plate.

35. Method according to claim 33, wherein changing pressure is stopped by stopping the pump as soon as curvature has been measured to have been minimized up to a tolerance level of not more than 100 μm.

36. Method according to claim 31, wherein changing pressure is applied to such an extent that the stimulable phosphor sheet layer is deformed in that its curvature is minimized, wherein said curvature is continuously measured by a device or apparatus connected with or present nearby the scanning unit or apparatus.

37. Method according to claim 36, wherein changing pressure is stopped as soon as curvature has been measured to have been minimized, followed by starting scanning of the stimulable phosphor plate.

38. Method according to claim 36, wherein changing pressure is stopped by stopping the pump as soon as curvature has been measured to have been minimized up to a tolerance level of not more than 100 μm.

39. Method of deforming the carrier or support material of an X-ray cassette according to claim 30 wherein a protective layer is provided at least as an outermost layer covering said storage phosphor layer and, optionally, as an auxiliary layer between said storage phosphor layer and said support, by the steps of
mounting said cassette in a scanning unit or apparatus;
connecting the inlet opening of the cassette with a pump;
changing pressure by sucking from or adding to the cassette air, an inert gas or a liquid.

40. Method of deforming the carrier or support material of an X-ray cassette according to claim 39 wherein said protective layer and said optionally present auxiliary layer, is a layer of parylene wherein said parylene is selected from the group consisting of parylene C, parylene D and parylene HT, by the steps of mounting said cassette in a scanning unit or apparatus;
connecting the inlet opening of the cassette with a pump;
changing pressure by sucking from or adding to the cassette air, an inert gas or a liquid.

41. Method according to claim 40, wherein changing pressure is applied to such an extent that the stimulable phosphor sheet layer is deformed in that its curvature is minimized, wherein said curvature is continuously measured by a device or apparatus connected with or present nearby the scanning unit or apparatus.

42. Method according to claim 41, wherein changing pressure is stopped as soon as curvature has been measured to have been minimized, followed by starting scanning of the stimulable phosphor plate.

43. Method according to claim 41, wherein changing pressure is stopped by stopping the pump as soon as curvature has been measured to have been minimized up to a tolerance level of not more than 100 μm.

44. Method according to claim 39, wherein changing pressure is applied to such an extent that the stimulable phosphor sheet layer is deformed in that its curvature is minimized, wherein said curvature is continuously measured by a device or apparatus connected with or present nearby the scanning unit or apparatus.

45. Method according to claim 44, wherein changing pressure is stopped as soon as curvature has been measured to have been minimized, followed by starting scanning of the stimulable phosphor plate.

46. Method according to claim 44, wherein changing pressure is stopped by stopping the pump as soon as curvature has been measured to have been minimized up to a tolerance level of not more than 100 μm.

47. Method according to claim 30, wherein changing pressure is applied to such an extent that the stimulable phosphor sheet layer is deformed in that its curvature is minimized, wherein said curvature is continuously measured by a device or apparatus connected with or present nearby the scanning unit or apparatus.

48. Method according to claim 47, wherein changing pressure is stopped as soon as curvature has been measured to have been minimized, followed by starting scanning of the stimulable phosphor plate.

49. Method according to claim 47, wherein changing pressure is stopped by stopping the pump as soon as curvature has been measured to have been minimized up to a tolerance level of not more than 100 μm.

50. Method of deforming the carrier or support material of an X-ray cassette according to claim 29 wherein said phosphor sheet layer is a binderless storage phosphor layer, by the steps of mounting said cassette in a scanning unit or apparatus;
connecting the inlet opening of the cassette with a pump;
changing pressure by sucking from or adding to the cassette air, an inert gas or a liquid.

51. Method of deforming the carrier or support material of an X-ray cassette according to claim 50 wherein said phosphor sheet layer comprises a binderless needle shaped CsX:Eu phosphor, wherein X represents a halide selected from the group consisting of Br and Cl, by the steps of mounting said cassette in a scanning unit or apparatus;
connecting the inlet opening of the cassette with a pump;
changing pressure by sucking from or adding to the cassette air, an inert gas or a liquid.

52. Method according to claim 51, wherein changing pressure is applied to such an extent that the stimulable phosphor sheet layer is deformed in that its curvature is minimized, wherein said curvature is continuously measured by a device or apparatus connected with or present nearby the scanning unit or apparatus.

53. Method according to claim 52, wherein changing pressure is stopped as soon as curvature has been measured to have been minimized, followed by starting scanning of the stimulable phosphor plate.

54. Method according to claim 52, wherein changing pressure is stopped by stopping the pump as soon as curvature has been measured to have been minimized up to a tolerance level of not more than 100 μm.

55. Method according to claim 50, wherein changing pressure is applied to such an extent that the stimulable phosphor sheet layer is deformed in that its curvature is minimized, wherein said curvature is continuously measured by a device or apparatus connected with or present nearby the scanning unit or apparatus.

56. Method according to claim 55, wherein changing pressure is stopped as soon as curvature has been measured to have been minimized, followed by starting scanning of the stimulable phosphor plate.

57. Method according to claim 55, wherein changing pressure is stopped by stopping the pump as soon as curvature has been measured to have been minimized up to a tolerance level of not more than 100 μm.

58. Method of deforming the carrier or support material of an X-ray cassette according to claim 29 wherein a protective layer is provided at least as an outermost layer covering said storage phosphor layer and, optionally, as an auxiliary layer between said storage phosphor layer and said support, by the steps of mounting said cassette in a scanning unit or apparatus;
connecting the inlet opening of the cassette with a pump;
changing pressure by sucking from or adding to the cassette air, an inert gas or a liquid.

59. Method of deforming the carrier or support material of an X-ray cassette according to claim 58 wherein said protective layer and said optionally present auxiliary layer, is a layer of parylene wherein said parylene is selected from the group consisting of parylene C, parylene D and parylene HT, by the steps of mounting said cassette in a scanning unit or apparatus;
connecting the inlet opening of the cassette with a pump;
changing pressure by sucking from or adding to the cassette air, an inert gas or a liquid.

60. Method according to claim 59, wherein changing pressure is applied to such an extent that the stimulable phosphor sheet layer is deformed in that its curvature is minimized, wherein said curvature is continuously measured by a device or apparatus connected with or present nearby the scanning unit or apparatus.

61. Method according to claim 60, wherein changing pressure is stopped as soon as curvature has been measured to have been minimized, followed by starting scanning of the stimulable phosphor plate.

62. Method according to claim 60, wherein changing pressure is stopped by stopping the pump as soon as curvature has been measured to have been minimized up to a tolerance level of not more than 100 μm.

63. Method according to claim 58, wherein changing pressure is applied to such an extent that the stimulable phosphor sheet layer is deformed in that its curvature is minimized, wherein said curvature is continuously measured by a device or apparatus connected with or present nearby the scanning unit or apparatus.

64. Method according to claim 63, wherein changing pressure is stopped as soon as curvature has been measured to have been minimized, followed by starting scanning of the stimulable phosphor plate.

65. Method according to claim 63, wherein changing pressure is stopped by stopping the pump as soon as curvature has been measured to have been minimized up to a tolerance level of not more than 100 μm.

66. Method according to claim 29, wherein changing pressure is applied to such an extent that the stimulable phosphor sheet layer is deformed in that its curvature is minimized, wherein said curvature is continuously measured by a device or apparatus connected with or present nearby the scanning unit or apparatus.

67. Method according to claim 66, wherein changing pressure is stopped as soon as curvature has been measured to have been minimized, followed by starting scanning of the stimulable phosphor plate.

68. Method according to claim 66, wherein changing pressure is stopped by stopping the pump as soon as curvature has been measured to have been minimized up to a tolerance level of not more than 100 μm.

69. Method for producing an X-ray cassette in form of a hollow box according to having a form of a hollow box, filled in the inner part with air, an inert gas or a liquid, said box comprising top and bottom, front and rear and lateral sides, said top and bottom sides having width dimensions, between said lateral sides; and depth dimensions, between said front and rear sides, which are substantially greater than the dimensions of said front, rear and lateral sides, between said top and bottom sides, wherein said bottom side and said front,rear and lateral sides have a higher material stiffness than the top side and wherein said top side is a deformable carrier or support material, characterized in that said support material is covered with a storage or stimulable phosphor sheet layer, by the steps of:
  providing a hollow box having plan parallel bottom and top sides,
  vacuum depositing a storage phosphor layer on said top side,
  vacuum depositing a protective parylene layer onto said storage phosphor layer.

70. Method for producing an X-ray cassette in form of a hollow box according to claim 69 wherein said hollow box, when filled with air, is further provided with an opening in one of the front, rear or lateral side, by the steps of:
  providing a hollow box having plan parallel bottom and top sides,
  vacuum depositing a storage phosphor layer on said top side,
  vacuum depositing a protective parylene layer onto said storage phosphor layer.

71. Method for producing an X-ray cassette in form of a hollow box according to claim 70 wherein said phosphor sheet layer is a binderless storage phosphor layer, by the steps of:
  providing a hollow box having plan parallel bottom and top sides,
  vacuum depositing a storage phosphor layer on said top side,
  vacuum depositing a protective parylene layer onto said storage phosphor layer.

72. Method for producing an X-ray cassette in form of a hollow box according to claim 71 wherein said phosphor sheet layer comprises a binderless needle shaped CsX:Eu phosphor, wherein X represents a halide selected from the group consisting of Br and Cl, by the steps of:
  providing a hollow box having plan parallel bottom and top sides,
  vacuum depositing a storage phosphor layer on said top side,
  vacuum depositing a protective parylene layer onto said storage phosphor layer.

73. Method for producing an X-ray cassette in form of a hollow box according to claim 70 wherein a protective layer is provided at least as an outermost layer covering said storage phosphor layer and, optionally, as an auxiliary layer between said storage phosphor layer and said support, by the steps of:
  providing a hollow box having plan parallel bottom and top sides,
  vacuum depositing a storage phosphor layer on said top side,
  vacuum depositing a protective parylene layer onto said storage phosphor layer.

74. Method for producing an X-ray cassette in form of a hollow box according to claim 73 wherein said protective layer and said optionally present auxiliary layer, is a layer of parylene wherein said parylene is selected from the group consisting of parylene C, parylene D and parylene HT, by the steps of:
  providing a hollow box having plan parallel bottom and top sides,
  vacuum depositing a storage phosphor layer on said top side,
  vacuum depositing a protective parylene layer onto said storage phosphor layer.

75. Method for producing an X-ray cassette in form of a hollow box according to claim 69 wherein said phosphor sheet layer is a binderless storage phosphor layer, by the steps of:
  providing a hollow box having plan parallel bottom and top sides,
  vacuum depositing a storage phosphor layer on said top side,
  vacuum depositing a protective parylene layer onto said storage phosphor layer.

76. Method for producing an X-ray cassette in form of a hollow box according to claim 75 wherein said phosphor sheet layer comprises a binderless needle shaped CsX:Eu phosphor, wherein X represents a halide selected from the group consisting of Br and Cl, by the steps of
  mounting said cassette in a scanning, by the steps of:
  providing a hollow box having plan parallel bottom and top sides,
  vacuum depositing a storage phosphor layer on said top side,
  vacuum depositing a protective parylene layer onto said storage phosphor layer.

77. Method for producing an X-ray cassette in form of a hollow box according to claim 69 wherein a protective layer is provided at least as an outermost layer covering said storage phosphor layer and, optionally, as an auxiliary layer between said storage phosphor layer and said support, by the steps of:
  providing a hollow box having plan parallel bottom and top sides,
  vacuum depositing a storage phosphor layer on said top side,
  vacuum depositing a protective parylene layer onto said storage phosphor layer.

78. Method for producing an X-ray cassette in form of a hollow box according to claim 77 wherein said protective layer and said optionally present auxiliary layer, is a layer of parylene wherein said parylene is selected from the group consisting of parylene C, parylene D and parylene HT, by the steps of:
  providing a hollow box having plan parallel bottom and top sides,
  vacuum depositing a storage phosphor layer on said top side,
  vacuum depositing a protective parylene layer onto said storage phosphor layer.

79. Method for producing an X-ray cassette in form of a hollow box according to having a form of a hollow box, filled in the inner part with air, an inert gas or a liquid, said box comprising top and bottom, front and rear and lateral sides, said top and bottom sides having width dimensions, between said lateral sides; and depth dimensions, between said front and rear sides, which are substantially greater than the dimensions of said front, rear and lateral sides, between said top and bottom sides, wherein said bottom side and said front,rear and lateral sides have a higher material stiffness than the top side and wherein said top side is a deformable carrier or support material, characterized in that said support material is covered with a storage or stimulable phosphor sheet layer, by the steps of:
  providing a hollow box having plan parallel bottom and top sides,
  vacuum depositing a protective parylene layer onto said top side,
  providing a storage phosphor layer having been coated or deposited onto a support from which it is releasable,
  laminating said storage phosphor layer onto said parylene layer, which covers the said hollow box,
  removing said support from which it is releasable,
  covering said phosphor layer with a protective layer.

80. Method for producing an X-ray cassette in form of a hollow box according to claim 79 wherein said hollow box, when filled with air, is further provided with an opening in one of the front, rear or lateral side by the steps of:
  providing a hollow box having plan parallel bottom and top sides,
  vacuum depositing a protective parylene layer onto said top side,
  providing a storage phosphor layer having been coated or deposited onto a support from which it is releasable,
  laminating said storage phosphor layer onto said parylene layer, which covers the said hollow box,
  removing said support from which it is releasable,
  covering said phosphor layer with a protective layer.

81. Method for producing an X-ray cassette in form of a hollow box according to claim 80 wherein said phosphor sheet layer is a binderless storage phosphor layer, by the steps of:
  providing a hollow box having plan parallel bottom and top sides,
  vacuum depositing a protective parylene layer onto said top side,
  providing a storage phosphor layer having been coated or deposited onto a support from which it is releasable,
  laminating said storage phosphor layer onto said parylene layer, which covers the said hollow box,
  removing said support from which it is releasable,
  covering said phosphor layer with a protective layer.

82. Method for producing an X-ray cassette in form of a hollow box according to claim 81 wherein said phosphor sheet layer comprises a binderless needle shaped CsX:Eu phosphor, wherein X represents a halide selected from the group consisting of Br and Cl, by the steps of:
  providing a hollow box having plan parallel bottom and top sides,
  vacuum depositing a protective parylene layer onto said top side,
  providing a storage phosphor layer having been coated or deposited onto a support from which it is releasable,
  laminating said storage phosphor layer onto said parylene layer, which covers the said hollow box,
  removing said support from which it is releasable,
  covering said phosphor layer with a protective layer.

83. Method for producing an X-ray cassette in form of a hollow box according to claim 80 wherein a protective layer is provided at least as an outermost layer covering said storage phosphor layer and, optionally, as an auxiliary layer between said storage phosphor layer and said support, by the steps of:
  providing a hollow box having plan parallel bottom and top sides,
  vacuum depositing a protective parylene layer onto said top side,
  providing a storage phosphor layer having been coated or deposited onto a support from which it is releasable,
  laminating said storage phosphor layer onto said parylene layer, which covers the said hollow box,
  removing said support from which it is releasable,
  covering said phosphor layer with a protective layer.

84. Method for producing an X-ray cassette in form of a hollow box according to claim 83 wherein said protective layer and said optionally present auxiliary layer, is a layer of parylene wherein said parylene is selected from the group consisting of parylene C, parylene D and parylene HT, by the steps of:
  providing a hollow box having plan parallel bottom and top sides,
  vacuum depositing a protective parylene layer onto said top side,
  providing a storage phosphor layer having been coated or deposited onto a support from which it is releasable,
  laminating said storage phosphor layer onto said parylene layer, which covers the said hollow box,
  removing said support from which it is releasable,
  covering said phosphor layer with a protective layer.

85. Method for producing an X-ray cassette in form of a hollow box according to claim 79 wherein said phosphor sheet layer is a binderless storage phosphor layer, by the steps of:
  providing a hollow box having plan parallel bottom and top sides,
  vacuum depositing a protective parylene layer onto said top side,
  providing a storage phosphor layer having been coated or deposited onto a support from which it is releasable,
  laminating said storage phosphor layer onto said parylene layer, which covers the said hollow box,
  removing said support from which it is releasable,
  covering said phosphor layer with a protective layer.

86. Method for producing an X-ray cassette in form of a hollow box according to claim 85 wherein said phosphor sheet layer comprises a binderless needle shaped CsX:Eu phosphor, wherein X represents a halide selected from the group consisting of Br and Cl, by the steps of:
  providing a hollow box having plan parallel bottom and top sides,
  vacuum depositing a protective parylene layer onto said top side, providing a storage phosphor layer having been coated or deposited onto a support from which it is releasable, laminating said storage phosphor layer onto said parylene layer, which covers the said hollow box, removing said support from which it is releasable, covering said phosphor layer with a protective layer.

87. Method for producing an X-ray cassette in form of a hollow box according to claim 79 wherein a protective layer is provided at least as an outermost layer covering said storage phosphor layer and, optionally, as an auxiliary layer between said storage phosphor layer and said support, by the steps of:

provoiding a hollow box having plan parallel bottom and top sides, vacuum depositing a protective parylene layer onto said top side, providing a storage phosphor layer having been coated or deposited onto a support from which it is releasable, laminating said storage phosphor layer onto said parylene layer, which covers the said hollow box, removing said support from which it is releasable, covering said phosphor layer with a protective layer.

88. Method for producing an X-ray cassette in form of a hollow box according to claim 87 wherein said protective layer and said optionally present auxiliary layer, is a layer of parylene wherein said parylene is selected from the group consisting of parylene C, parylene D and parylene HT, by the steps of:

providing a hollow box having plan parallel bottom and top sides, vacuum depositing a protective parylene layer onto said top side, providing a storage phosphor layer having been coated or deposited onto a support from which it is releasable, laminating said storage phosphor layer onto said parylene layer, which covers the said hollow box, removing said support from which it is releasable, covering said phosphor layer with a protective layer.

* * * * *